J. T. GERMAIN.
FEED MECHANISM FOR SEEDERS.
APPLICATION FILED OCT. 28, 1920.
1,411,778.
Patented Apr. 4, 1922.
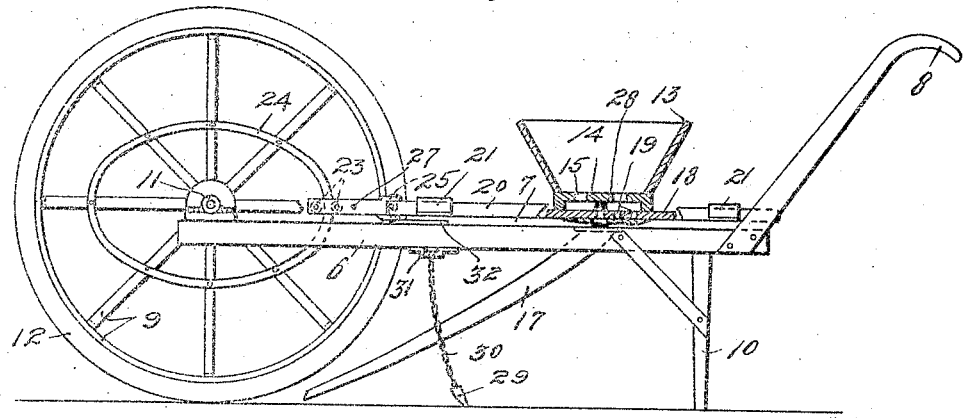
Fig. 1
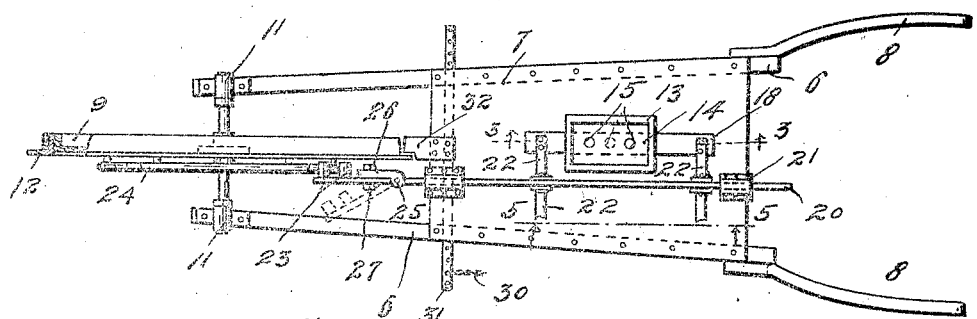
Fig. 2
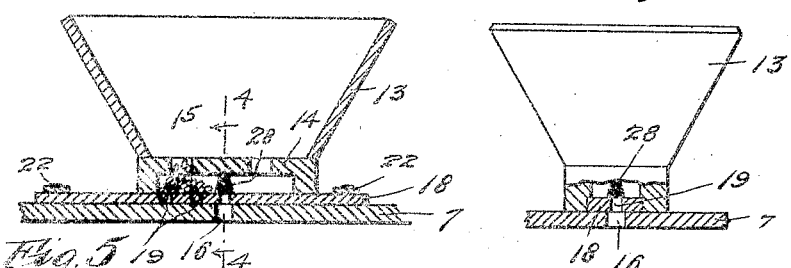
Fig. 3  Fig. 4
Fig. 5
Inventor
John T Germain
By his Attorney
Harry D. Kilgore

UNITED STATES PATENT OFFICE.

JOHN T. GERMAIN, OF BRAINERD, MINNESOTA.

FEED MECHANISM FOR SEEDERS.

1,411,778.     Specification of Letters Patent.     Patented Apr. 4, 1922.

Original application filed May 6, 1920, Serial No. 379,228. Divided and this application filed October 28, 1920. Serial No. 420,215.

*To all whom it may concern:*

Be it known that I, JOHN T. GERMAIN, a subject of the King of Great Britain, residing at Brainerd, in the county of Crow Wing and State of Minnesota, have invented certain new and useful Improvements in Feed Mechanism for Seeders; and I do hereby declare the following to be a full, clear, and exact description of the invention, such as will enable others skilled in the art to which it appertains to make and use the same.

My invention has for its object to provide an extremely simple and highly efficient seeder of the hand-operated type, and is a division of my co-pending application filed May 6, 1920, under Serial Number 379,228.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of the improved seeder principally in left side elevation, with some parts sectioned through one of the seed boxes;

Fig. 2 is a plan view, with some parts broken away and some parts sectioned;

Fig. 3 is a detail view in section taken on the line 3—3 of Fig. 2;

Fig. 4 is a view partly in rear elevation and partly in transverse section taken on the line 4—4 of Fig. 3; and Fig. 5 is a detail view in longitudinal section taken on the line 5—5 of Fig. 2.

The frame of the improved seeder comprises a pair of forwardly converging bars 6 that are rigidly connected by a bottom board 7 and have on their rear ends handle bars 8. Said frame is supported at its front end by a single large wheel 9 and at its rear end by a pair of legs 10. The wheel 9 is located between the forwardly projecting ends of the frame bars 6 and its axle is journaled in bearings 11 on said frame bars. On the periphery of the wheel 9 is an annular furrow opener 12. Secured to the bottom board 7 are two laterally spaced seed boxes 13, each of which is provided with a false bottom 14, in which is formed two longitudinally spaced apertures 15.

The bottom board 7 affords the bottoms of the two seed boxes 13 and formed therein, under each seed box, is a discharge port 16 located substantially half-way between the respective apertures 15. A seed spout 17 is arranged to receive from the two discharge ports 16 and its delivery end is located under the wheel 9 rearward of its contact with the ground and in the plane of the furrow opener 12. Co-operating with each seed box 13 is a reciprocating seed plate 18, which rests directly on the bottom board 7 and is held for straight endwise movement by openings in the ends of the respective seed box 13.

As shown, three longitudinally spaced seed-collecting cells 19 are formed in each seed plate 18 and arranged to be successively brought into registration with the underlying discharge port 16 during the reciprocatory movement of said seed plate. It is also important to note, by reference to Figs. 2 and 4, that when one of the seed cells 19 is in registration with the respective discharge port 16, the other discharge port 16 is closed. The seed plates 18 are simultaneously operated by means of a reciprocating bar 20 mounted in guides 21 on the bottom board 7.

A pair of cross arms 22 rigidly connect the seed plates 18 to the reciprocating bar 20. On the forward end of the reciprocating bar 20 is a pair of roller-equipped cam studs 23, between which travels an endless oval-shaped cam bar 24 rigidly secured to the wheel 9 at one side thereof.

To permit the improved seeder to be wheeled from place to place without operating the seed plates 18, there is formed in the reciprocating bar 20 a hinged joint 25, which permits the front end portion of said bar to be swung laterally and thereby carry the roller-equipped studs 23 out of engagement with the cam bar 24, as indicated by broken lines in Fig. 2. To hold the two sections of the reciprocating bar 20 aligned with the roller-equipped cam studs 23 in position to be engaged by the cam bar 24, there is formed with the rear end portion of the reciprocating bar 20 a forwardly projecting finger 26 arranged to be detachably secured to the front end portion of said reciprocating bar by a nut-equipped bolt 27.

Brushes 28, secured to the false bottoms 14, are arranged to close the seed-collecting cells 19, when brought into registration with the discharge port 16, and thereby prevent other seeds from entering said cells. A check-row marker 29 is attached by a chain 30 to a transverse bar 31 secured to the frame side bars 26. This bar 31 is provided with a multiplicity of longitudinally spaced perforations at either end to receive the chain 30 and permit the check-row marker 29 to be attached on either side of the seeder and at different points to vary the width of the rows. A flat scraper 32 is secured to the bottom board 7 and arranged to keep the wheel 9 and furrow opener 12 clean.

In ordinary seeding, one of the seed plates 18 will be thrown out of action by detaching the same from the cross arms 22. The other seed plate 18, as the same is reciprocated under the advance movement of the seeder, releases seed collected in the seed cells 19 as said cells are successively brought into registration with the respective discharge port 16. From said discharge port, the seed will roll down the seed spout 17 and be deposited in the furrow as the same is formed by the furrow opener 12. Any suitable means, not shown, may be provided for covering the seed. The distance the seeds are planted apart in the furrow depends on the longitudinal spacing of the seed cells 19, and to vary this distance, interchangeable seed plates with differently spaced seed cells will be provided.

In some instances, it is possible and desirable, with certain kinds of plants, to sow two different kinds of seeds in the same furrow, and in which case, the other or second seed plate will be connected to the cross arms 22 and the seed cells in this seed plate are so arranged and spaced as to only release seeds at a time when they will be deposited in the furrow between the seeds deposited from the other seed plate. The cross arms 22 will be detachably secured to the reciprocating bar 20 by nut-equipped bolts or other separable fasteners.

What I claim is:

1. A seeder having a seed box with a discharge port, a movable seed plate in the seed box and having a seed-collecting cell arranged to be brought into and out of registration with the discharge port, a false bottom in the seed box overlying the seed plate and having a constantly open aperture that is laterally offset from the discharge port, a brush under the false bottom arranged to close said cell when in registration with the discharge port.

2. A seeder having a seed box with a discharge port, a reciprocating seed plate in the seed box and having a plurality of seed-collecting cells arranged to be successively brought into registration with the discharge port, a false bottom in the seed box overlying the seed plate and having two constantly open apertures laterally spaced in the direction of the movement of the seed plate and located one on each side of the discharge port, and a brush under the false bottom between said two apertures and arranged to close said cells when brought into registration with the discharge port.

In testimony whereof I affix my signature.

JOHN T. GERMAIN.